Patented July 10, 1928.

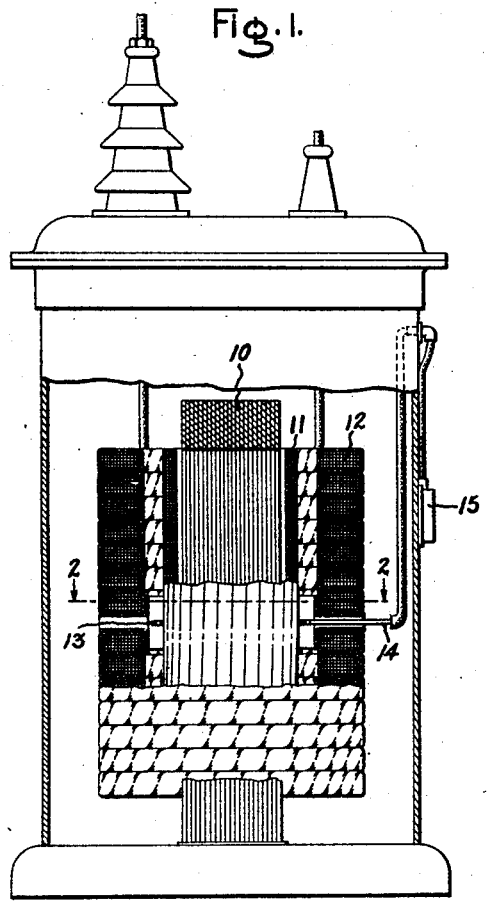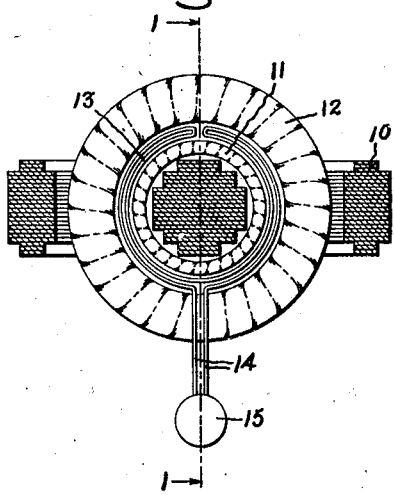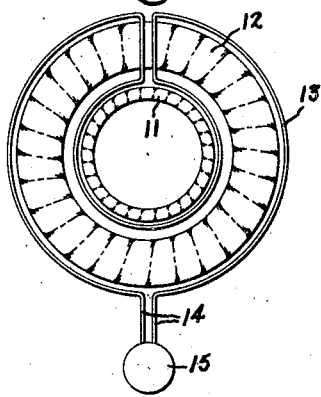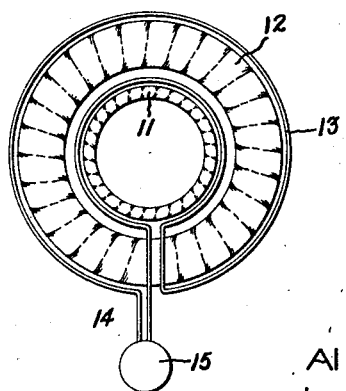

1,677,084

UNITED STATES PATENT OFFICE.

ALLAN B. HENDRICKS, JR., OF PITTSFIELD, MASSACHUSETTS, ASSIGNOR TO GENERAL ELECTRIC COMPANY, A CORPORATION OF NEW YORK.

TRANSFORMER.

Application filed September 2, 1927. Serial No. 217,035.

My invention relates to transformers. The proper supervision and operation of transformers, especially in connection with high voltage transformers of large capacity, usually requires some means responsive to load conditions for operating various devices such as load indicating instruments and protective relays. Current transformers have been commonly used for this purpose, but they are large and expensive. The general object of the invention is to provide an improved construction and arrangement for this purpose which shall be simple, inexpensive, and reliable.

The invention will be understood from the following description taken in connection with the accompanying drawing in which Fig. 1 shows a transformer, partly in section on the line 1—1 of Fig. 2, and provided with a load responsive device arranged in accordance with the invention, Fig. 2 is a sectional view on the line 2—2 of Fig. 1, and Figs. 3 and 4 show modified forms of the invention.

Like reference characters indicate similar parts in the different figures of the drawing.

The invention will be explained in connection with the shell type transformer shown in the drawing. This transformer has a core 10 with a central winding leg surrounded by a low voltage primary winding 11 and a high voltage secondary winding 12. The two windings are separated by a concentric space to provide insulation and ventilation for the windings.

An auxiliary conductor or winding 13, with its terminals 14 connected to an instrument 15, is arranged noninductively with respect to the main magnetic flux in the core 10 but inductively with respect to at least a portion of the leakage magnetic flux so that a voltage will be induced in this winding which is proportional to such portion of the leakage flux as is enclosed by the winding. The value of the leakage flux and the density of this flux at any point in its path are proportional to the load on the transformer and thus the voltage induced in the winding 13 is proportional to the load. The winding 13 may be connected to operate any suitable electrical instrument such as a protective relay or an indicating instrument of the voltmeter type graduated in amperes or other suitable load units.

An arrangement is shown in Figs. 1 and 2 in which the winding 13 is in the form of a long narrow loop disposed entirely within the space between the two windings 11 and 12 of the transformer. As shown in Fig. 2 a part of this winding 13 which forms one long side of this loop is near the low voltage winding 11, and the part forming the other long side of the loop is spaced from the first part near the high voltage winding 12. Thus the winding 13 encloses a portion of the leakage flux path so that a voltage will be induced which is proportional to the leakage flux and to the load on the transformer. As is apparent from Fig. 2, the two parts of the winding have the same number of turns about the main flux in the winding leg of the core and are arranged so that the voltages induced in them by the main flux are opposed. The winding 13 is therefore noninductively arranged with respect to the main flux and the voltage at its terminals will be independent of the main flux.

Another arrangement of the winding 13, shown in Fig. 3, is similar to that shown in Fig. 2 except that the outer long side of the loop formed by this winding is just outside the secondary or high voltage winding so that the winding encloses the leakage flux which flows through the high voltage winding as well as most of this flux which flows in the space between the high and low voltage windings. The terminals 14 of the winding 13 are shown in both Fig. 2 and Fig. 3 as being connected near the center of its outer long side.

Still another arrangement of the winding 13, shown in Fig. 4, is similar to that shown in Fig. 3 except that the terminals 14 are connected at one end of the loop forming this winding instead of near the center of one of its long sides.

The invention provides a simple, accurate, and reliable source of current for operating or controlling an instrument in connection with a transformer where the current must be proportional to the load on the transformer. The invention has been explained by describing several different forms and arrangements thereof, but it will be apparent that various other changes may be made without departing from the scope of the invention as defined in the appended claims.

What I claim as new and desire to claim by Letters Patent of the United States is:

1. The combination with a transformer having a core provided with primary and secondary windings, of an auxiliary winding enclosing at least a portion of the magnetic leakage flux path of said transformer, said auxiliary winding being arranged non-inductively with respect to the main magnetic flux in said core and being provided with terminals for connection to an outside circuit.

2. The combination with a transformer having a core provided with primary and secondary windings, said windings being separated to provide a space therebetween in the leakage flux path, of an auxiliary winding enclosing a portion of the leakage flux path within said space and arranged non-inductively with respect to the main magnetic flux in said core, said auxiliary winding being provided with terminals for connection to an outside circuit.

In witness whereof, I have hereunto set my hand this 30 day of August, 1927.

ALLAN B. HENDRICKS, Jr